United States Patent [19]

Olsen

[11] 4,152,191
[45] May 1, 1979

[54] CURING A REPLACEABLE TREAD FOR A BIG TIRE

[75] Inventor: Richard J. Olsen, Massillon, Ohio

[73] Assignee: The Goodyear Tire & Rubber Company, Akron, Ohio

[21] Appl. No.: 841,227

[22] Filed: Oct. 11, 1977

[51] Int. Cl.² .............................................. B29H 5/04
[52] U.S. Cl. .................................... 156/414; 156/127; 156/129; 425/15; 425/26
[58] Field of Search ............................ 156/96, 126–129, 156/414–420, 112; 425/11, 12, 15, 17, 120, 26, 27

[56] References Cited

U.S. PATENT DOCUMENTS

| | | | |
|---|---|---|---|
| 1,080,860 | 12/1913 | Stevens | 156/112 |
| 1,183,551 | 5/1916 | Gammeter et al. | 156/112 |
| 1,424,134 | 7/1922 | Litchfield | 156/112 |
| 2,035,390 | 3/1936 | Kraft | 156/416 |
| 2,320,778 | 6/1943 | Herman | 425/15 |
| 3,503,432 | 3/1970 | Maiocchi | 156/124 |
| 3,926,711 | 12/1975 | Wolfe | 156/96 |

FOREIGN PATENT DOCUMENTS 20952 of 1899 United Kingdom ..................... 156/417

Primary Examiner—John E. Kittle
Attorney, Agent, or Firm—R. S. Washburn

[57] ABSTRACT

An endless tread assembly is fabricated on a ring having grooves and ridges which mold the radially inward surface of the tread assembly. The ring is a thin walled cylinder having a single slit or gap. The tread assembly on the ring is suspended by rotatable wheels rollable on the inward surface of the ring, so as to position an arcuate portion of the ring and tread assembly between a fixed press arm and a single movable heated press mold shoe operable to mold about a 40 degree arc of the tread assembly between the shoe and the ring backed by the press arm. Lugs on the inward surface of the ring cooperate with a latch fixed on the press arm to index selected increments of the tread assembly and ring between the press arm and mold segment. After all arcuate increments of the tread assembly have been molded and cured, the ring is opened at the gap and then simply flexed to reduce its diameter sufficiently to remove the cured tread assembly. The foregoing abstract is not to be taken as limiting the invention of this application, and in order to understand the full nature and extent of the technical disclosure of this application, reference must be made to the accompanying drawing and the following detailed description.

4 Claims, 3 Drawing Figures

CURING A REPLACEABLE TREAD FOR A BIG TIRE

The present invention relates to making big tires and particularly to giant tires increasingly required for earthmoving, mining, and construction equipment. More particularly, the invention relates to making such big tires of the type comprising a tire body or carcass having radial plies and an endless belt-reinforced tread which is separately built and cured and subsequently applied to the carcass, usually after the latter has been cured, to form the giant tire.

The manufacture of such tires, and particularly the molding and curing of such tires, requires extremely costly equipment the cost of which rises exponentially with the size of the tire. This is particularly true in the case of radial ply tires in which the tread is reinforced with substantially inextensible circumferential belts since the molding of such tires requires molds having segmented tread rings capable of closing centripetally. This cost is further increased in a tire having an independently mold-cured tread for the reason that the tread assembly itself also requires segmented inner mold parts which are capable of moving centrifugally.

Heavy earthmoving, mining, and construction equipment cannot be built and sold successfully without an assured supply of tires of suitable size. On the other hand, tires of such size cannot be constructed without suitable equipment, and investment in such equipment is prohibitively expensive unless there is a reasonably assured demand for the particular size tire to be produced.

A principal object of the present invention, therefore, is to enable the manufacture of a giant tire having a tread molded and cured independently of the radial ply carcass for such tire, particularly upon an interim or experimental development basis, in a wide variety of sizes without costly equipment.

This, and other objects and advantages of the invention, will be made more apparent as the description proceeds.

Broadly, the invention comprises a method of making a tire tread comprising providing a building and molding ring having a predetermined pattern of grooves and ridges on its outer cylindrical surface; fabricating an endless tread assembly on said ring, the tread having a core of parallel closely spaced cord or wire reinforcement elements and an uncured elastomeric cover of tread compound, disposing said ring and said uncured tread assembly in press means having a single heated mold shoe for applying heat and molding pressure to an arcuate portion of said belt and a pressure arm disposed within said ring for applying pressure radially outward of the ring in opposition to said shoe, and indexing said ring and said tread together to place remaining arcuate portions of said tread successively in said press means to complete the molding and curing of said tread assembly, and removing said tread in its cured state axially from said ring for use on a tire.

The invention further comprises an apparatus for making a tire tread comprising building and molding ring means comprising a hollow cylindrical member of rigid elasticly resilient metal having a predetermined pattern of grooves in its outer surface, means for displacing a portion of said member inwardly, and indexing means for registering equal arcuate portions of said surface at a predetermined location, press means for molding and curing at successive intervals selected arcuate portions of said tread on said ring means and comprising press arm means disposable within said ring means and mold shoe means comprising a single mold shoe of arcuate width length less than about 40 degrees movable toward and away from said tread on said ring means and said press arm means, and latching means cooperable with said indexing means to locate said ring means in successive predetermined arcuate locations relative to said press means.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof.

Figure 1:
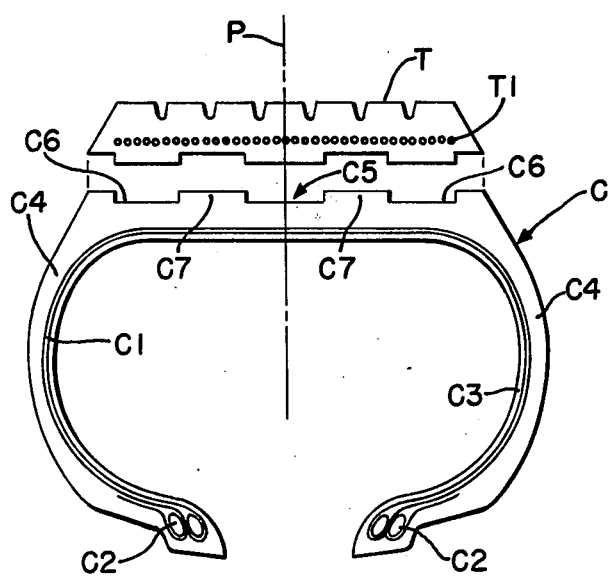
FIG. 1 illustrates in exploded cross-section a giant tire having a carcass and a tread assembly cured independently of the carcass and then joined thereto to complete the giant tire.

Referring to the drawings and particularly to FIG. 1, there is shown a tire carcass C having plies $C_1$ extending about and secured to inextensible bead rings $C_2$. The plies are covered within the cavity by an impervious elastomeric liner $C_3$ and on the outside by suitable rubber compounds $C_4$. The carcass C can be of one or more plies and of radial or bias ply construction. In the crown region $C_5$, the tire carcass is provided with a plurality of circumferentially extending grooves $C_6$ and alternating ridges $C_7$ devised to locate and to secure the tread assembly T thereon.

The tread assembly comprises an endless annulus of suitable tread rubber compound and an undertread of a suitable, and usually other rubber compound. Between the tread and undertread and securely embedded in the assembly is a belt $T_1$ comprising a cord or cable of suitable material such as multiple plied, stranded steel wire which is wound at an approximately zero degree angle, with respect to a plane P normal to the tire axis, in a closely spaced helix which is generally cylindrical in form and extends nearly the full width from one to the other of the lateral edges of the tread which edges will become part of the shoulders of the completed tire. Alternative cord or cable arrangements can be employed in the belt provided only that the belt is substantially inextensible.

The tread assembly may include, additionally, metal bars to which can be secured cleats or grousers in known manner.

Figure 2:
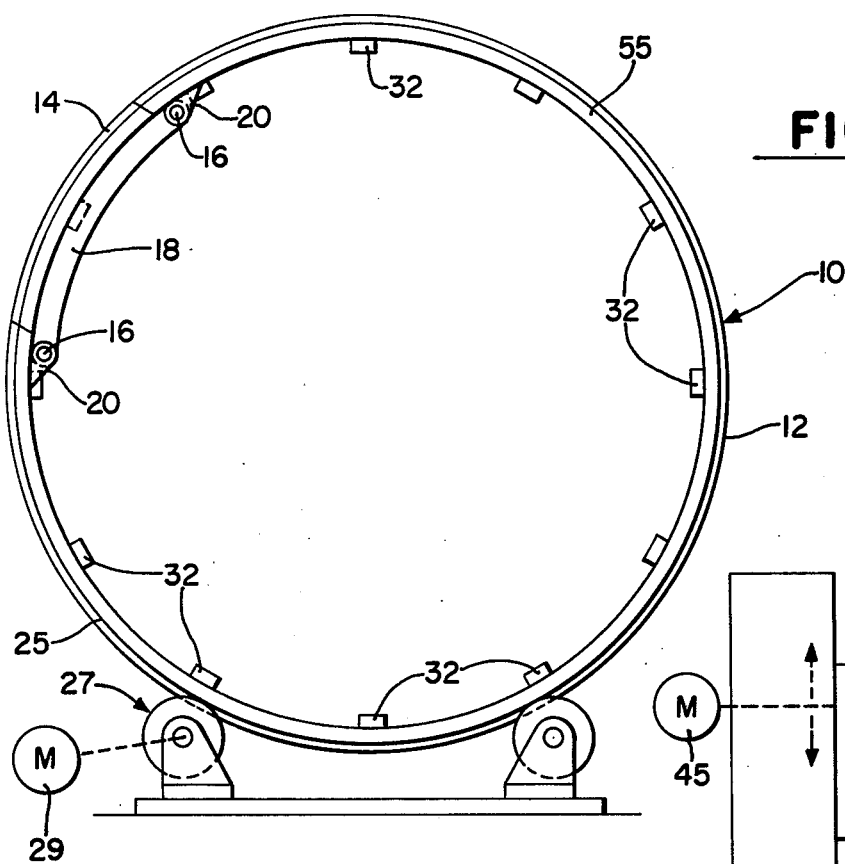
FIG. 2 illustrates in elevation a portion of the apparatus in accordance with the invention.

In FIG. 2, there is illustrated a building and molding ring in accordance with the invention, the outer cylindrical surface of which is essentially a replica of the pattern of ridges $C_6$ and grooves $C_7$ desired in the tire carcass and which pattern of ridges and grooves will first form and then mold and cure the inner surface of the tread assembly. The building and molding ring 10 in the present apparatus is provided with a removable or displaceable section 14 which is secured in place by a plurality of removable pins 16 (best seen in FIG. 3). The displaceable section is provided with a flange 18 near each of its lateral edges which lie between and respectively face-to-face with a plurality of lugs 20 secured to the inner circumference of the mold ring. The flanges and the lugs are correspondingly bored to receive the removable pins 16 and thereby secure the displaceable section in the ring 10.

It is contemplated within the scope of the present invention that a ring be provided with a single split or break "line" such that one end of the ring at the line can be sprung inwardly of the other end at the split line so as to reduce the circumference of the ring and permit the removal of the tread after the same has been cured.

The building and molding ring 10 is formed of metal plate having a wall thickness of from 1½ to 2 inches (about 35 to 50 mm) and is very thin relative to its overall diameter which is about 70 inches or greater. The ring 10 in the present example is about 92 inches (about 235 cm) in diameter. Low carbon steel plate or, if preferred, an aluminum alloy plate is rolled to form a cylinder of the desired overall diameter. The resilience of the plate which forms the ring allows forcing means such as the well-known portable rachet winch, commonly called a "come along", can be attached to the respective lugs 20 after the displaceable section has been removed and be operated to spring the ring to make the opening left by the displaceable section smaller thereby reducing the circumference of the ring to permit removal of the tread T after the same has been molded and cured.

The building and molding ring is provided at its lateral edges with a pair of shoulders 25 which can rollably engage the wheels of a cradle 27 as seen in FIG. 2. Optionally, but preferably, a motor 29 may be connected to rotate the rolls of the cradle and thereby rotate the building and molding ring.

On the internal cylindrical surface of the ring 10, a plurality of equally angularly spaced lugs 32 provide indexing means presently to be described more fully.

Figure 3:
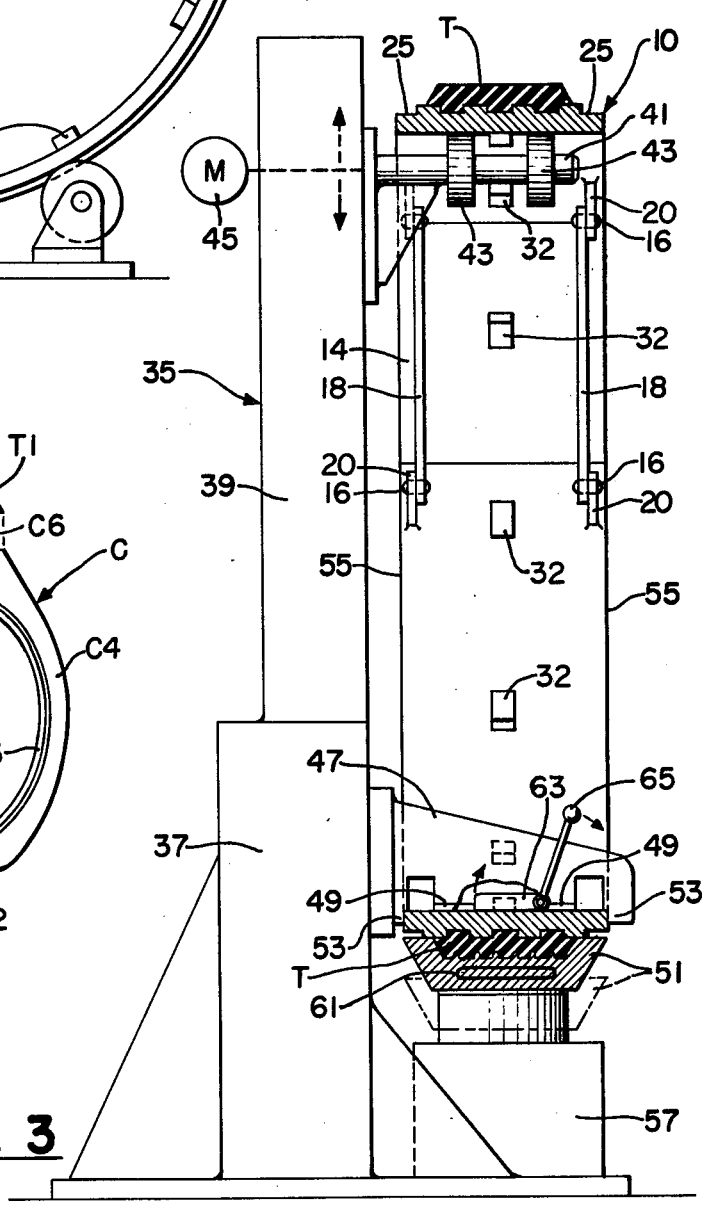
FIG. 3 illustrates in elevation cross-section a further portion of the apparatus in accordance with the invention.

FIG. 3 illustrates further the apparatus adapted for molding and curing successive arcuate increments of the tread. A press frame 35 comprising a base 37 and a column 39 carries a supporting beam 41 which can be raised or lowered with respect to the column to suit the diameter of the ring 10. The beam carries a pair of support rollers 43 which engage the inner circumference of the ring and permit its rotation as required. Optionally, a motor 45 can be provided to rotate the ring on demand. The press includes a press arm 47 rigidly attached to the base 37. The arm includes a pair of slippers 49 which bear on the inner circumference of the ring and oppose the force exerted by a single outer tread mold shoe 51. The press arm also has a pair of guide ears 53 which cooperate with the guide surfaces 55 provided by the radial faces of the ring 10, thereby to locate the ring laterally with respect to the outer tread mold shoe 51.

The shoe 51 is moved toward and away from the press arm 47 by a hydraulic press 57 which operates to press mold selected successive arcuate portions of the tread assembly T. The mold shoe can be provided with heating means 61 such as an electric resistance heater or a steam jacket as desired.

A latch pivotally mounted in the press arm and operated by a lever or handle 65 engages one of the index lugs 32 corresponding to that arcuate portion of the tread assembly to be molded and cured. After the cure of such selected arcuate portion, the handle is operated to release the latch 63 from the index lug and allow the ring 10 to be rotated to a position wherein the next selected arcuate portion of the tread assembly can be cured.

In operation a tire tread is constructed by selecting or preparing a building and molding ring such as the ring 10 providing thereon a pattern of ridges and grooves identical to the pattern of ridges and grooves provided or to be provided on the tire carcass C as described. The ring is then mounted rotatably on the cradle 27 or its equivalent, resting the ring shoulders 25 on the wheels 27 of the cradle so that the patterned cylindrical surface 12 is unobstructed. Successive layers of undertread are then built up on the surface of the ring, taking care to fill with undertread material the grooves of the desired pattern. Successive layers of suitable undertread compound are wound upon the ring in the manner illustrated in FIG. 2. With the undertread built up to provide a cylindrical surface, reinforcing cord elements such as cords or cable are then wound in a continuous closely spaced cylindrical helix to provide the inextensible circumferential restrictor belt $T_1$ of the tread assembly. The individual elements of the belt are disposed at or very close to zero degree angle with respect to the plane P.

After the reinforcement elements have been placed, the outer, wear portion of the tread is built up in endless form overlying and encapsulating the belt.

The building and molding ring 10 with the built up uncured endless tread thereon is then moved to the press FIG. 3 where the ring is suspended on the support rollers 43 and around the press arm 47 so that the slippers 49 are engageable with the inner circumference of the ring and so that the lateral width of the ring is located between the respective guide ears 53 on the press arm.

The ring 10 is rotated, if necessary, to position one of the index lugs 32 in alignment with the latch 63 which is then closed to position the ring angularly and to locate the selected arcuate portion of the tread assembly to be cured. The outer tread mold shoe 51 is then raised by actuating the hydraulic press 57 to mold the non-skid or traction grooves desired in the outer portion of the tread assembly. The heating means is activated to apply the desired time and temperature of the molding and curing cycle for the particularly selected first arcuate portion of the belt assembly.

The arrangement is such that the operation of the hydraulic press and the outer tread mold shoe will lift the ring slightly to insure its location between the guide ears and its positive seating on the slippers of the press arm.

When sufficient time at the applied temperature has elapsed the outer tread mold shoe 51 is moved away, downward from the tread assembly. Then the index latch 63 is released and the ring is rotated to a next selected arcuate portion of the tread assembly. Normally, this can be an increment of about 30 degrees of rotation whereupon the cycle described is repeated to a mold and cure a second selected portion of the tread assembly and thereafter is repeated a sufficient number of times, for example, 12, to complete the molding and curing of the entire circumference of the tread assembly. The arcuate portions to be molded and cured can be selected as desired, for example, alternating mold-/cured section-uncured section, the latter then being mold/cured as the ring is indexed around a second revolution.

After the molding and curing operation in the press is completed, the displaceable section 14 of the ring is removed, the "come-along" device is attached to the respective lugs 20 and the exposed ends of the ring are forced toward one another to reduce the circumference of the building and molding ring 10 sufficiently to permit the tread assembly to be easily removed in a direction generally axially of the building and molding ring.

The advantages, particularly as to the cost involved, of the present method and apparatus contrasted with the heretofore required segmented molds for molding and curing such large tread assembly will be apparent. Particularly to be noted is the advantage of the ability to manufacture a separately molded and cured tread assembly for a different size tire by providing a relatively simple building and curing mold ring and a single arcuate segment enables the user to supply experimental and developmental tread assemblies for a wide range of sizes and applications.

While certain representative embodiments and details have been shown for the purpose of illustrating the invention, it will be apparent to those skilled in the art that various changes and modifications may be made therein without departing from the spirit or scope of the invention.

What is claimed is:

1. An apparatus for making a tire tread comprising building and molding ring means comprising a hollow cylindrical member of rigid elasticly resilient metal having a predetermined pattern of grooves in its outer surface, means for displacing a portion of said member inwardly, and indexing means for registering equal arcuate portions of said surface at a predetermined location, press means for molding and curing at successive intervals selected arcuate portions of said tread on said ring means and comprising press arm means disposable within said ring means and mold shoe means comprising a single mold shoe of arcuate width length less than about 40 degrees movable toward and away from said tread on said ring means and said press arm means, and latching means cooperable with said indexing means to locate said ring means in successive predetermined arcuate locations relative to said press means.

2. An apparatus as claimed in claim 1, said means for displacing comprising a single removable section of said ring.

3. An apparatus as claimed in claim 1, said means for displacing comprising forcing means operable to deflect a portion of said member inward of an adjacent portion thereof.

4. An apparatus as claimed in claim 1, 2, or 3, said press means having means for applying heat to said tread at said location.

* * * * *